(12) United States Patent
Schwab (10) Patent No.: US 8,208,208 B2
(45) Date of Patent: Jun. 26, 2012

(54) OPTICAL ASSEMBLY WITH A ROLLER BEARING LINEAR GUIDE AND A MOTORIZED DRIVE

(76) Inventor: Martin Schwab, Obererlbach (DE)

(*) Notice: Subject to any disclaimer, the term of this patent is extended or adjusted under 35 U.S.C. 154(b) by 291 days.

(21) Appl. No.: 12/530,958

(22) PCT Filed: Jul. 4, 2007

(86) PCT No.: PCT/EP2007/005914
§ 371 (c)(1),
(2), (4) Date: Sep. 11, 2009

(87) PCT Pub. No.: WO2008/110189
PCT Pub. Date: Sep. 18, 2008

(65) Prior Publication Data
US 2010/0091391 A1   Apr. 15, 2010

(30) Foreign Application Priority Data
Mar. 13, 2007   (DE) .......................... 10 2007 012 589

(51) Int. Cl.
*G02B 15/14* (2006.01)
(52) U.S. Cl. ........................................................ 359/704
(58) Field of Classification Search .................... 359/704
See application file for complete search history.

(56) References Cited

U.S. PATENT DOCUMENTS

| 3,971,599 | A | 7/1976 | Shio |
| 4,031,383 | A | 6/1977 | Hosoe et al. |
| 7,656,596 | B2* | 2/2010 | Matsumoto ................... 359/826 |
| 2004/0070851 | A1 | 4/2004 | Koba et al. |
| 2004/0174590 | A1 | 9/2004 | Kinoshita et al. |
| 2006/0187562 | A1 | 8/2006 | Mounnarat |

FOREIGN PATENT DOCUMENTS

| CN | 1487324 A | 4/2004 |
| DE | 2449719 Y | 9/1975 |
| DE | 2844773 Y | 4/1979 |
| DE | 3832741 | 4/1990 |
| DE | 19804471 | 8/1999 |
| EP | 1795934 | 6/2007 |
| JP | 50-107945 A | 9/1975 |
| JP | 59-74268 U | 5/1984 |
| JP | 08-029656 X | 2/1996 |
| JP | 9236737 | 9/1997 |
| JP | 2003043372 A | 2/2003 |
| JP | 2006-259583 A | 9/2006 |
| JP | 2006-309164 A | 11/2006 |
| JP | 2007-025640 A | 2/2007 |
| JP | 2007-047583 A | 2/2007 |
| WO | 2006/109587 X | 10/2006 |

OTHER PUBLICATIONS

English language translation of Japanese Office Action issued in counterpart JP Application No. 2009-553011, dated Jul. 12, 2011.

* cited by examiner

*Primary Examiner* — Joseph P Martinez
(74) *Attorney, Agent, or Firm* — Lucas & Mercanti, LLP (57) ABSTRACT

Optical assembly consisting of at least one lens holder and a stator, wherein the lens holder (1) is mounted on the stator (2) via a roller bearing linear guide with roller body guide tracks (A, B, C, D) constructed on the lens holder (1) and on the stator (2), in the region of which linear guide a motorized actuator element (7) engages with the lens holder (1) in such a way that the lens holder (1) is movable relative to the stator along an axis vertical to an image recording plane of an image recording means (4).

23 Claims, 9 Drawing Sheets

OPTICAL ASSEMBLY WITH A ROLLER BEARING LINEAR GUIDE AND A MOTORIZED DRIVE

CROSS REFERENCES AND INCORPORATION BY REFERENCE

This is a U.S. National Phase Application under 35 U.S.C. 371 of International Application PCT/EP2007/005914, filed Jul. 4, 2007, which claimed the priority of DE 10 2007 012 589.7 are incorporated herein by reference.

The invention relates to an optical assembly comprising at least one optical component, in particular a lens support, and a stator.

In photography and in filming, the image quality is dependent in particular on two factors: on the one hand on the accurate positioning of the focus plane on the image plane of the image-recording elements (for example film or digital sensor) along the optical axis. On the other hand, the focal plane should be as plane-parallel as possible to the plane of the image recording. The necessary accuracies become more stringent the smaller the image recording areas are. For a modern digital sensor, the permissible discrepancy is in the region of only a few micrometers.

Particularly in the case of physically very small optics and camera arrangements, in particular in the case of mobile telephone cameras, considerable problems result when it is intended to provide a capability to adjust the optical assembly.

The invention is therefore based on the problem of specifying an optical assembly which can be designed to be as small as possible and allows high-precision positioning of the moving components with respect to an image-recording element.

In order to solve this problem, an optical assembly is provided comprising at least one optical component, in particular a lens support, and a stator, wherein the optical component, in particular the lens support, is mounted on the stator via a roller bearing linear guide with rolling body guide paths which are formed on the optical component, in particular on the lens support and on the stator, in the area of which linear guide a motor actuating element acts on the optical component, in particular on the lens support, such that the optical component, in particular the lens support, can be moved relative to the stator along an axis which is at right angles to an image recording plane of an image recording means.

The invention improves the guidance and positioning of lenses and objectives or optical individual components in the beam path of an optical assembly and makes it possible to produce physically very small optics which can also be integrated when very little space is available, for example optics of mobile telephone cameras. The invention achieves, to a major extent, the required demand for accuracy. Simple manufacture, the capability to make the parts very small, and the high-precision positioning without play when necessary are advantages of the invention.

According to the invention, a rolling body bearing is provided for the optical component, in particular in the form of a lens support on the stator, wherein the lens support may have an optical lens, or else other optical components such as a diaphragm, a shutter or the like can be arranged on a suitable support or may comprise such, or which can be arranged on the lens support itself. Exact positioning along the movement axis is possible via a motor actuating element which acts in the area of the linear guide, that is to say directly on the mechanical guide itself. The rolling body bearing allows the moving parts to be borne exactly and without play with respect to one another, with the parts being in a defined relative position with respect to one another during the movement, and movement is possible only along the depicted movement axis, thus ensuring that the central optical constraint, specifically the plane-parallelity of the focal plane to the image recording plane, is always satisfied.

In a development of the invention, a side attachment can be provided on the optical component, in particular on the lens support, on which attachment two guide paths are formed which are opposite one another at the side, which attachment engages in a holding area, which is provided on the stator and has two mutually opposite guide paths, wherein the mutually opposite guide paths of the attachment and of the holding area complement one another to form two guide channels. The bearing is therefore a double-sided bearing via two guide channels, which is implemented in a simple manner in that a side attachment is provided on the lens support which, for example, is an annular or hollow-cylindrical part, on the outside of which attachment two component and lens-support guide paths are provided, exactly opposite one another, while a holding area is provided on the preferably hollow-cylindrical stator, for example in the form of an aperture, wherein two stator guide paths are provided in the holding area and thus provide two guide channels, in which the rolling bodies run, when the attachment is inserted. The geometry of the guide paths and therefore of the guide channels is, of course, matched to the geometry of the rolling bodies. Balls, rollers or needles may be used.

The rolling bodies themselves may be held in a prestressed manner, thus resulting overall in a bearing which is completely free of play. This can be achieved by the capability for the guide paths of the stator to be sprung, which can be achieved in a simple manner from the design point of view by providing the guide paths on sections which are sprung on the stator. The holding area is therefore provided on these sprung sections and in this refinement is preferably in the form of an aperture, thus making it possible to provide a certain amount of spring capability for the sections which are preferably separated from the stator base via a narrow gap, in order to allow the spring capability.

It is also possible to provide for the optical component, in particular the lens support, to be guided via at least three rolling bodies, wherein two rolling bodies are provided in one guide channel, and one rolling body is provided in the other guide channel. This result in a linear bearing which is adequate when seen in the axial direction and allows exact relative movement, in particular in conjunction with given prestressing in the linear bearing. However, for example, four rolling bodies are also feasible, that is to say two for each guide channel.

In one preferred inventive refinement, for movement of the optical component, in particular of the lens support relative to the stator, a toothed section, with which a pinion on the motor actuating element engages, is provided on a or the side attachment which is provided on the optical component, in particular on the lens support. The attachment which has the guide paths is preferably provided with the toothed section, although it is also feasible to provide a separate attachment for this purpose. A corresponding pinion, which engages with the toothed section, is provided on the motor actuating element, a miniaturized motor which is arranged in a fixed position on the stator. The actuating element is operated appropriately via a suitable control device which, for example, is integrated in the mobile telephone and is part of the camera device there, in order to achieve the desired optics adjustment. It is also feasible to use an electromechanical motor such as a piezomotor which acts on the optical component, in particular the lens support, on an acting section, which is formed there, with a piezoelectrically moving actuating element.

The simplest inventive refinement comprises only one optical component, in particular only one lens support and one stator, that is to say an optical element such as a lens can be moved relative to the image-recording element which is arranged on the stator, for example a digital sensor. According to one particularly expedient inventive refinement, two or more optical components, in particular lens supports and a common stator, are provided. The inventive alternative provides two or more components, preferably lens supports, which are associated with a common stator and can move relative to it. This makes it possible to produce widely differing optics with different optical characteristics.

In this case, each optical component, in particular each lens support, can be moved separately relative to the stator via its own motor actuating element. According to this inventive alternative, each individual lens support is thus mounted, for example, via its own roller bearing on the stator, each lens support can be adjusted separately relative to the stator via its own toothed section and its own motor actuating element. According to one alternative, at least some of the optical components, in particular the lens support (or all), are coupled to one another for movement purposes and can be moved via a common motor actuating element, while the other optical component or components, in particular the other lens support or supports, can be moved relative to the stator via possibly in each case one dedicated motor actuating element. In this inventive refinement, two or more movement-coupled components, that is to say components which have a fixed position relationship with one another, and their supports or the lens supports, for example, are thus moved together via a common motor actuating element. This assembly which, for example, is in the form of a lens support assembly, has only a single toothed section and a single section via which this movement-coupled assembly is mounted on the stator via a suitable rolling body linear guide. The lens support or supports which is or are not coupled for movement purposes, or another optical component, are or is mounted separately on the stator via its or their own rolling body linear guides and can be moved via separate toothed sections on the respective attachment and its or their own motor actuating elements.

On the basis of these different basic refinements, optical assemblies of different design are feasible. According to a first inventive alternative, two or more optical components, for example lens supports, are provided, whose attachments are located one above the other and engage in a common holding area. Each of these components, that is to say each lens support, can be moved separately, that is to say it has a separate associated motor actuating element which engages with in each case one toothed section on its own component support or lens support. The components and lens supports are located one above the other, their attachments engage in a common holding area which is provided on the stator side, and the rolling body linear guide of each individual component or each individual lens support is provided in this area.

As an alternative to this, two or more optical components or lens supports can be provided, wherein the attachments on the components or lens supports which are arranged one above the other are aligned rotatable through an angle with respect to one another, preferably alternately to one side and rotated through 180° to the other side, wherein holding areas for the respective attachments are provided, corresponding to the position of the attachments, offset, preferably on mutually opposite sides of the stator. The attachments on the plurality of components, in particular on the lens supports, are therefore not all provided on the same side, but are provided alternately on one side and the other side, which means that two stator-side holding areas must be provided in this refinement. If, for example, three lens supports are provided for this inventive refinement, then the attachments on the lower and on the upper lens support may be located one above the other and may engage in a common holding area, while the attachment on the central lens support is arranged on the opposite side, and engages in a holding area which is provided on the opposite stator side. The central lens support is therefore rotated through 180°, and a total of three motor actuating drives are provided, by means of which each lens support can also be adjusted separately in this case. Instead of rotation through 180°, any other angle offset, for example through 120°, through 90° or through 60°, is also feasible.

One inventive alternative provides three or more optical components, in particular lens supports, wherein only the lower first and the following second component, in particular the corresponding lens support, have an attachment, which attachments are positioned rotated through an angle, preferably 180°, with respect to one another and are arranged in corresponding holding areas in the stator, and wherein the third and possibly following component, in particular the corresponding lens support, is or are coupled for movement purposes to the lower first or the following second corresponding component, in particular to the lens support, via a connecting arm. By way of example, according to this inventive refinement, only two lens supports of the plurality of lens support or other optical components have an attachment, wherein these attachments are preferably arranged rotated through 180° with respect to one another. In a corresponding manner, two holding areas, which are offset through the same angular offset, that is to say preferably 180°, are provided on the stator, in order to provide rolling body linear guides. Further optical components such as lens supports are coupled for movement purposes via a connecting arm to the first or the second component, in particular to the corresponding lens support, which, as described, are arranged mounted on rolling bodies on the stator. In this case, therefore, component or lens support groups which have a fixed position relationship via the connecting arm can be moved jointly by one motor, and two separate actuating motors are necessarily used in this case. For example, when there are four lens supports, two lens support groups can be formed. In this case as well, other angular offsets, for example through 120°, through 90° or through 60°, can also be provided instead of rotation through 180°.

As described, different optical components can be constructed. A central component is a lens support on which a lens is arranged which can be moved via the lens support. However, it is also possible to provide as the optical component a shutter, via which the exposure of the image recording chip is controlled, and/or a diaphragm which, for example, are/is arranged on their own suitable supports. A component such as this can be moved separately via these supports, for which purpose a support such as this, such as a lens support, has a corresponding toothed section or other movement coupling section corresponding to the nature of the actuating drive being used. A shutter and a diaphragm can also be integrated in a common part, which means that only one part need be moved. Instead of using a dedicated component support and thus dedicated movement capability of the component relative to the other components, it is also feasible for the component, that is to say for example the shutter or the diaphragm or the part which contains the two of them, to be arranged on one lens support together with the lens. This is advantageous in order to avoid any imaging errors resulting from the distance between the shutter/diaphragm and the lens, for example, being too great. In this case, the shutter or the diaphragm is therefore moved together with the lens.

When a plurality of motor actuating elements are used, it is expedient for them to be operated via a common control device, for example that of a mobile telephone.

Furthermore, one or more attachment elements for attachment of the optical assembly to a third object can be provided on the stator. These attachment elements may be screw connections or snap-action latching connections. Attachment elements such as these which allow simple fitting, in particular automated fitting of the optical assembly to the third object, preferably a mobile telephone, are preferred. It is also feasible to provide an adhesive surface as an attachment element, via which the stator and therefore the entire optical assembly can be adhesively bonded to the third object.

One development provides a flexible printed circuit ribbon (so-called flexible ribbon) which can be connected to an external control device, preferably of the one mobile telephone, to which the image recording means and the motor actuating element or elements and possibly an optical component to be operated such as a shutter or a diaphragm, which contains parts to be moved, are connected. A conductive ribbon which can be processed easily is therefore used, having all the connecting lines which are used for operation and control of the image recording unit, thus allowing control access to the optical assembly via an external control device.

The optical assembly is encapsulated on the outside and is protected against external influences by a metallic housing.

The invention also relates to a mobile telephone, comprising an optical assembly of the described type.

Further advantages, features and details of the invention will become evident from the exemplary embodiments described in the following text and from the drawing, in which.

FIGS. 1 to 8 show a first exemplary embodiment of an objective for a mobile telephone with an integrated chip, as well as the individual parts—lens support and stator—and the completely fabricated assembly. The basic assembly shown in FIGS. 1-8 for forming optics or a camera or an image recording unit essentially comprises two parts: the so-called barrel or lens support 1 and the stator 2. The lens support 1 has two or more guide paths A and B along the optical axis, which are suitable as a raceway for rolling bodies. The guide paths A, B are formed opposite one another on a side attachment 5.

Figure 1:
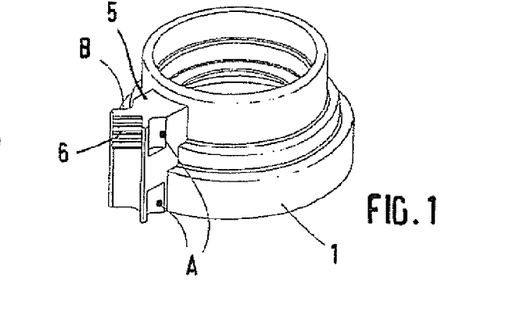
FIG. 1 shows a perspective view of a lens support.
Figure 2:
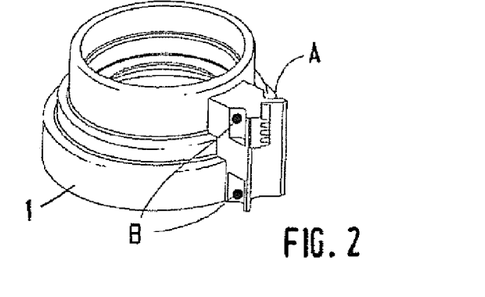
FIG. 2 shows a rotated view of the lens support shown in FIG. 1.
Figure 3:
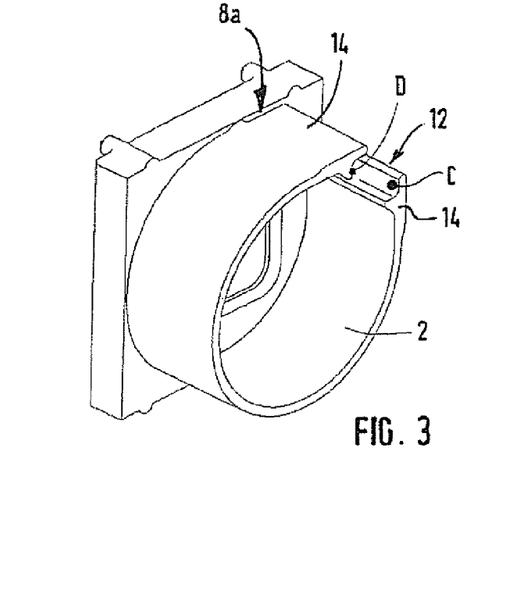
FIG. 3 shows a perspective view of a stator.
Figure 4:
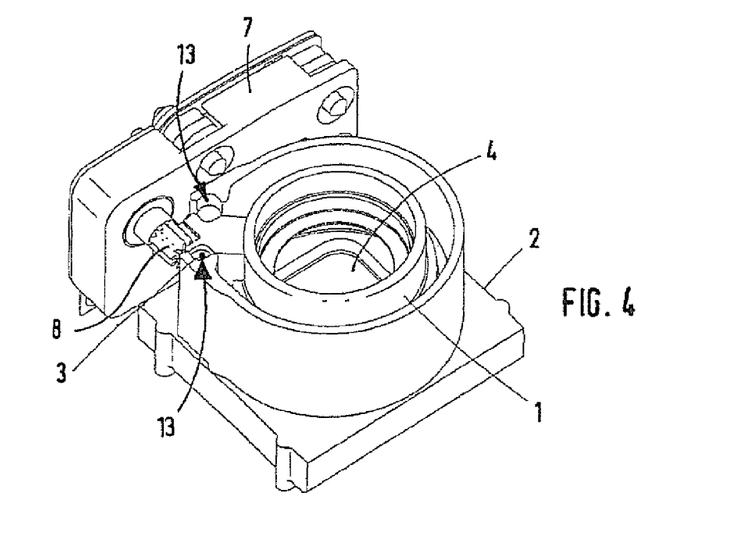
FIG. 4 shows a view of an optical assembly according to a first embodiment of the lens support from FIGS. 1 and 2 and the stator from FIG. 3.
Figure 5:
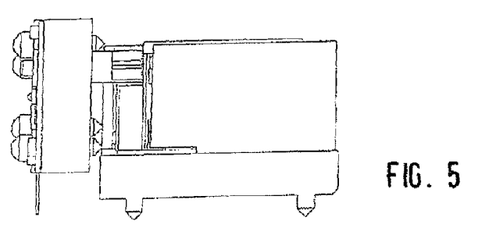
FIG. 5 shows a side view of the optical assembly from FIG. 4.

The stator 2, on which a digital chip 4 which is used for image recording is arranged, likewise has guide paths C and D, which run along the optical axis and between which a holding area 12 is provided, in which the attachment 5 on the lens support engages, see FIG. 4. The two geometries and arrangements of the guide paths A, B, C, D are designed such that they form mutually opposite guide channels 13 when the parts are assembled, in which rolling bodies 3, in this case balls, can roll.

If the parts are now fitted with at least three rolling bodies 3, and possibly also with the four rolling bodies 3 shown here, the two parts comprising the lens support 1 and the stator 2 can be moved relative to one another. During this process, the rolling bodies roll on the guide paths A, B, C, D. This results in rolling friction which represents a considerable advantage over conventional sliding friction guides. In the case of the present invention, there is no slipstick effect even in the case of very small positioning movements. The required drive force is reduced to the rolling friction, and is therefore extremely small.

A toothed section 6 is provided on the attachment 5 for drive purposes. A very small motor 7 (micromotor) with a pinion 8 which engages with the toothed section 6 (cf. FIGS. 4-8) is used for movement of the lens support 1 relative to the stator 2, in which the lens support 1 is partially or completely held after assembly. Via this, the lens support 1 can be moved with the lens inserted in it, although this is not shown here in any more detail, axially along the roller bearing guide and thus along a movement axis which is exactly at right angles to the chip image plane. The motor 7 is operated via a suitable control device.

Prestressing is preferably provided, and stabilizes all the rolling bodies. However, this is not absolutely essential since a cage structure which guides individual rolling bodies (similar to a ball bearing) is likewise feasible. Rolling bodies other than balls (for example rollers or needles) are feasible, and the guide paths must then be designed appropriately. The prestressing guarantees that the accuracy of the planicity of the image and image recording plane (chip plane) is achieved as well as possible. In the case of known solutions, particularly in the case of small digital objectives, the play in the sliding guides causes a major imaging error.

In the present solution, the image recording (chip 4) can be installed and positioned directly in the stator 2. Since it is aligned with the same part as the lens support 1, the positioning errors between image recording and the optics are extremely small. The accuracies are therefore now dependent only on minor part tolerances.

Very small forces are sufficient to deform the lenses, making a considerable contribution to the loss of imaging quality. If the guide geometry is provided and is implemented according to the invention, such that the prestressing force is not passed to the lens support 1, then the lenses have no external forces acting on them whatsoever. Statically and dynamically, this is a major improvement for the image quality. In the present embodiment, the prestressing forces on the lens support 1 are eliminated by the arrangement of the guide paths. This can therefore be installed and positioned without any stresses.

The guide paths A, B, C, D in the stator 2 or else in the lens support 1 can be prestressed or else sprung. The pressure force with which the rolling bodies 3 are pressed onto the path is thus adjustable and can be readjusted. In the illustrated example, the stator paths C, D are sprung, that is to say the sections 14 which have the stator-side guide paths C, D are not firmly connected to the support for the chip 4 at the bottom but are separated via a short, narrow gap 8a, in order to allow the spring capability.

Figures 6, 7, 8:
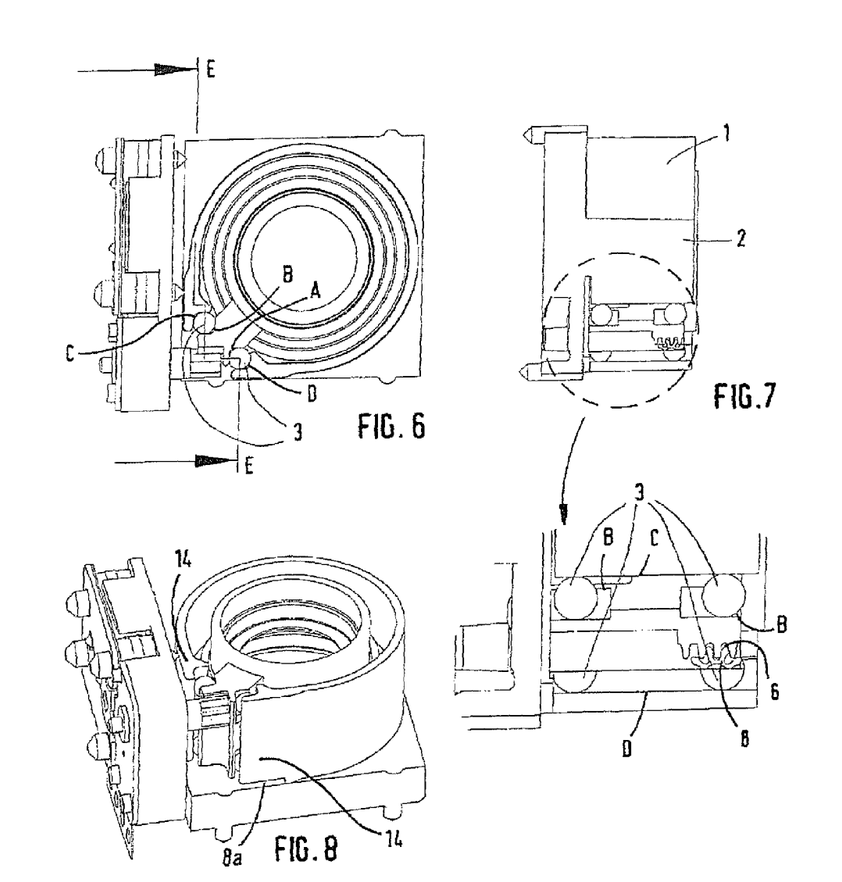
FIG. 6 shows a plan view of the optical assembly from FIG. 4.
FIG. 7 shows a section view in the direction of the line E-E in FIG. 6 and an enlarged illustration of the linear guide.
FIG. 8 shows a rotated perspective illustration of the optical assembly from FIG. 4.

If the moving element—in this case the lens support 1—is driven in the vicinity of the bearing, as is provided according to the invention via the direct attachment of the motor pinion 8 on the bearing-side toothed section 6, then the drive forces do not influence the moving element in any way. The forces are absorbed by the guide, and extremely accurate positioning is possible, with very minor errors. FIG. 6 and the enlarged illustration in FIG. 7, in particular, show the design of the linear guide. The figures show the rolling bodies 3 as well as the guide paths A, B, C, D on the attachment 5 and on the stator 2, as well as the toothed section 6 and the pinion 8. The guide paths A and B in this example are not continuous but are subdivided into two respective sections, in this context see also FIGS. 1 and 2.

Figure 9:
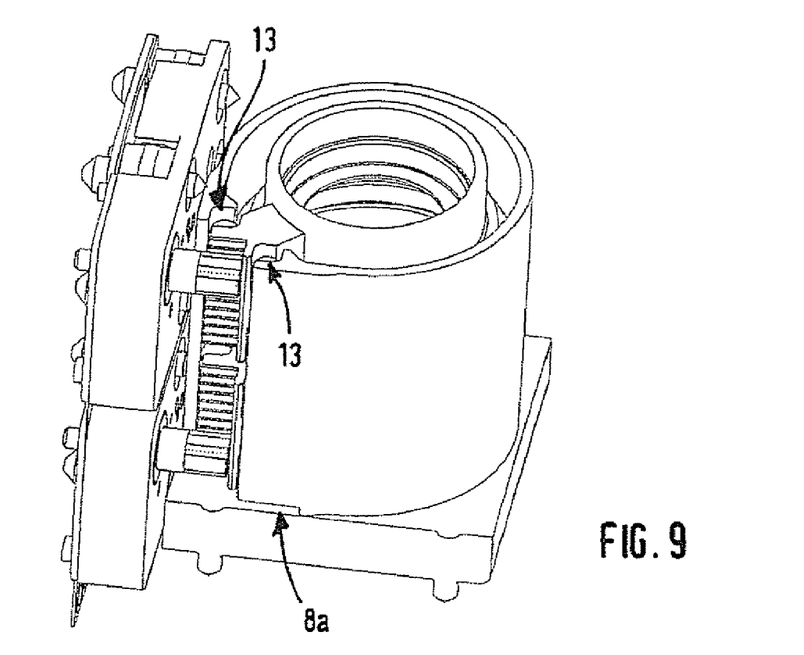
FIG. 9 shows an illustration of a second embodiment according to the invention of an optical assembly with two lens groups, which can be moved independently of one another by two motors.
Figure 10:
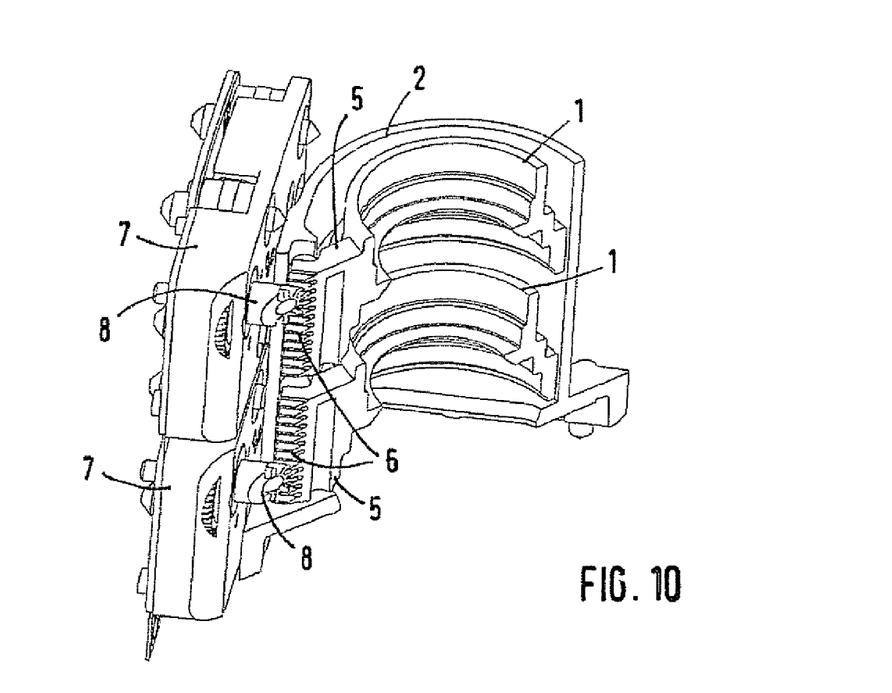
FIG. 10 shows a longitudinal section view through the optical assembly shown in FIG. 9.
Figure 11:
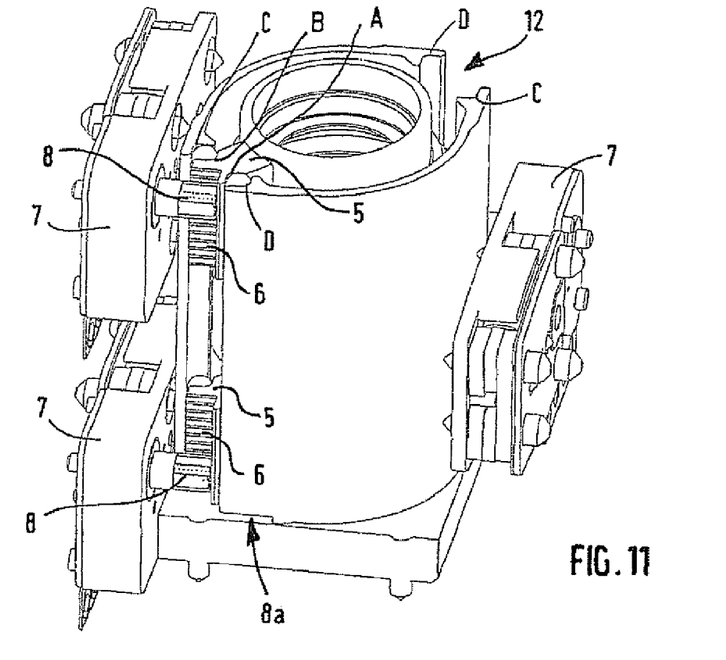
FIG. 11 shows a third embodiment of an optical assembly having three lens groups which can be moved independently of one another by three motors.
Figure 12:
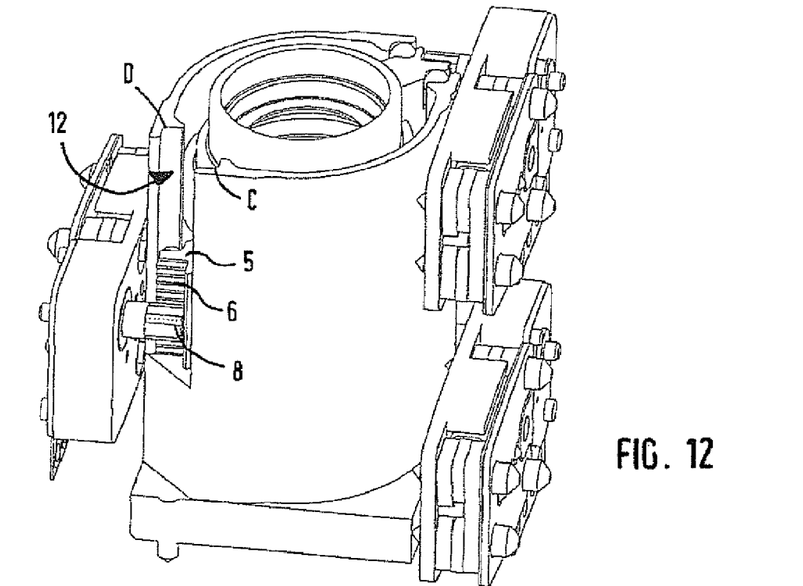
FIG. 12 shows a rotated view of the optical assembly from FIG. 11.
Figures 13, 14, 15, 16:
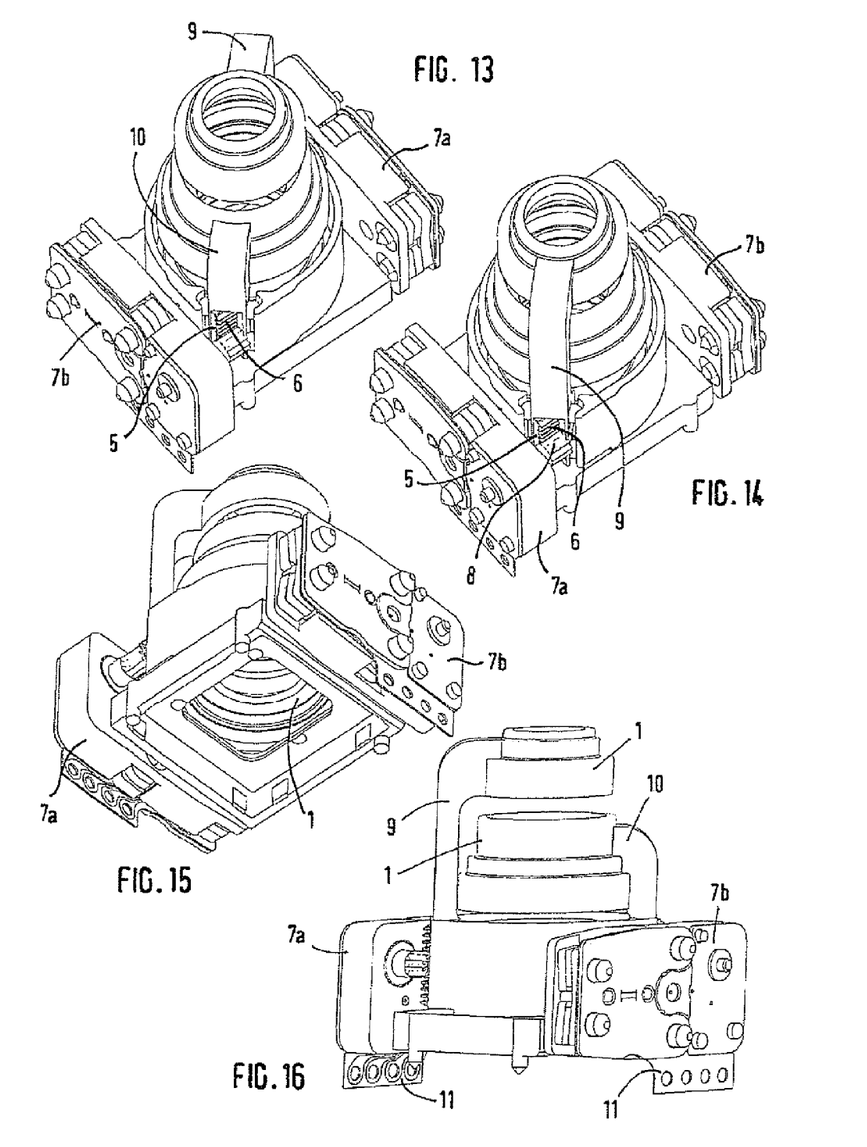
FIG. 13 shows a fourth embodiment, in which two lens supports are coupled for movement purposes and are moved at the same time, while a further lens support is moved therebetween independently.
FIG. 14 shows a rotated view of the optical assembly from FIG. 13.
FIG. 15 shows a view from underneath of the optical assembly from FIG. 13.
FIG. 16 shows a side view of the optical assembly from FIG. 13, FIGS. 17-20 show four different perspective side views of one embodiment of a further optical assembly according to the invention.
Figure 17:
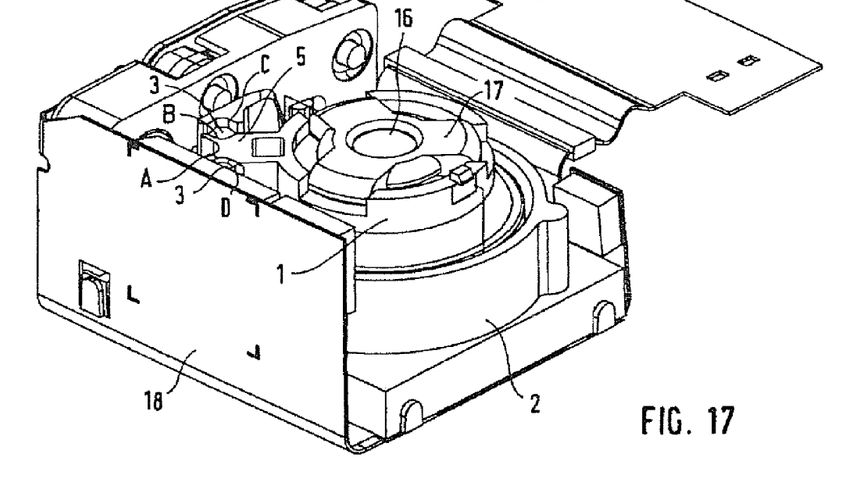
Figure 18:
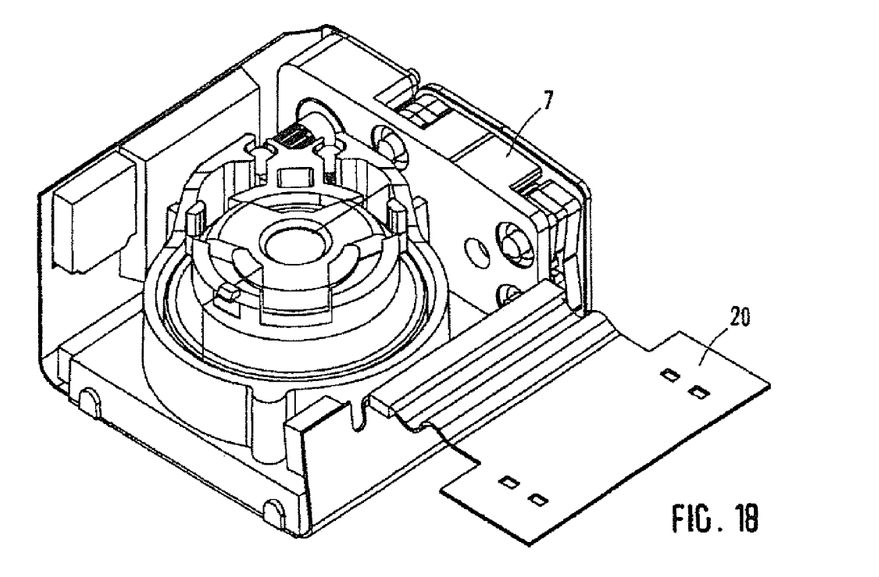
Figure 19:
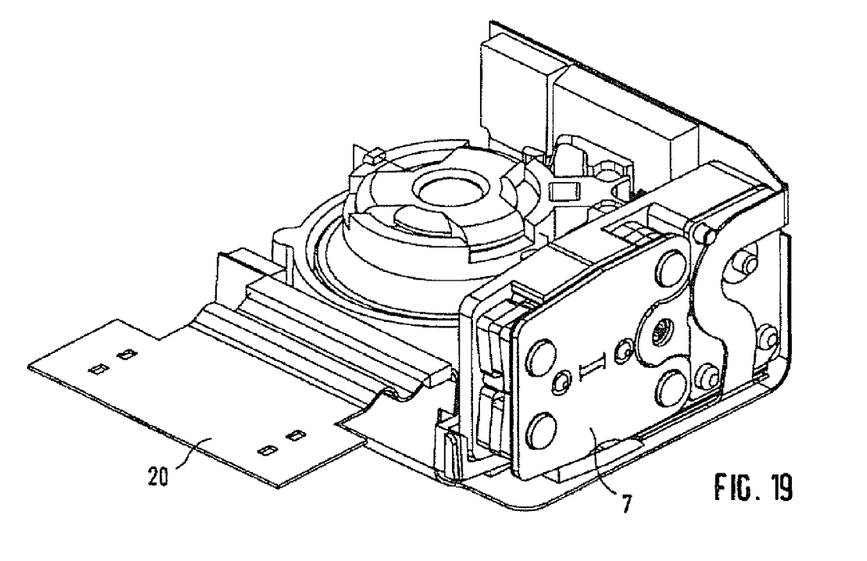
Figure 20:
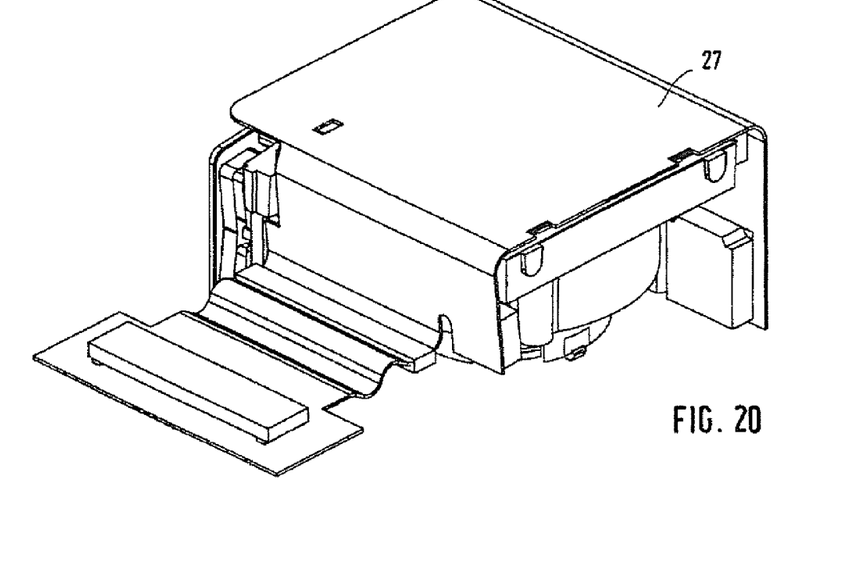

FIGS. 9 and 10 show a second embodiment of an optical assembly with two lens groups, which can be moved independently of one another by two motors, both running in the same guide paths of the stator. FIG. 9 and the sectioned FIG. 10 show two lens supports 1 each having a lens (not shown), which are held in a common stator 2. As in the case of the embodiment described above, each lens support 1 has two guide paths A, B on the respective attachment 5, and on the stator 2 likewise two guide paths C, D are formed in order to form the rolling body channels 13. Each attachment 5 has its own toothed section 6 and, furthermore, two motors 7 are provided which can be operated separately, can be driven separately via a preferably common control device and each have a pinion 8, one of which in each case engages with one of the toothed sections 6 of the lens supports 1. The two lens supports 1 can be moved separately from one another and can be adjusted axially relative to the chip 4 arranged on the stator side (not shown here), exactly at right angles to its image recording plane FIGS. 11 and 12 show a third embodiment of an optical assembly with three lens groups which can be moved independently of one another by three motors. In the embodiment shown in FIGS. 11 and (rotated through) 180° 12, three lens supports 1 are provided, of the type described above. These are held jointly in a stator 2. This has an elongated aperture (holding areas 12) on two opposite sides, at whose edge two guide paths C, D are in each case formed. While the upper and the lower lens support 1 are arranged to be coincident with one another with the same orientation, the central lens support 1 is arranged rotated through 180° with respect thereto and its attachment 5 engages between the two other guide paths C, D. In a corresponding manner, two motors 7 are provided on one stator side for separate movement of the upper and lower lens supports 1, while one motor 7 is arranged on the other side, for movement of the central lens support 1. All the lens supports 1 and therefore lenses or lens groups (in principle, only one or else a plurality of lenses may be arranged in one lens support 1) can be moved separately from one another and with respect to one another. The drive is also provided in this case via toothed sections 6 and motor-side pinions 8.

FIGS. 13 to 16 show a fourth embodiment, in which two lens supports are coupled for movement purposes and are moved at the same time, while a further lens support is moved independently therebetween, corresponding to the basic design of a zoom objective. FIGS. 13 to 16 show (miniature) optics according to the invention in which three lens supports 1 are once again provided, each having one or more lenses. In this case as well, only one stator 2 is provided, although this is not as high as the overall height of the three lens supports 1 and in fact, in this case, only the lower lens support 19 is held in the stator 2. The lower lens support 1 and the upper lens support 1 are connected via a connecting arm 9 such that they can be moved via the associated motor 7a and the attachment 5, which is located on the lower lens support, with the toothed section 6 jointly relative to the central lens support 1 with its lens (group) and with respect to the image recording chip (not shown) (for example CCD chip 4). The central lens support 1 can in turn be moved by its own motor 7b. Since the stator 2 does not surround the central lens support 1, this is provided with a bearing arm 10 which forms the attachment 5 and on which the toothed section 6 and the guide paths A, B are formed. The stator 2 in this case also has two mutually opposite apertures (holding areas 12), on which the guide paths C, D for supporting the lower lens support 1 and the central lens support 1 are provided. The two motors 7a, 7b are located on one plane. A refinement such as this makes it possible to provide zoom optics or a zoom camera.

As FIGS. 13-16 also show, attachment elements 11 are provided, by means of which the optics or camera can be attached to a third object, for example a mobile telephone housing. Screw connections or snap-action latching connections or the like may be provided as attachment elements. Attachment elements such as these can be provided in a preferred manner in all the described refinements.

Instead of the lens support, other optical components can also be moved, such as shutters, individual lenses, diaphragms, etc. A plurality of moving components are likewise feasible. It is also feasible to move a plurality of components independently of one another, for example to form a zoom objective, as described with reference to FIGS. 13-16.

FIGS. 17-20 show a further optical assembly according to the invention, which corresponds in principle to the design of the optical assembly shown in FIGS. 1-8. Once again, this has a stator 2 and a lens support 1, wherein the roller bearing linear guide according to the invention with the guide paths A, B, C and D and the rolling bodies 3 guided in the guide channels is provided between the two of them. See also FIG. 21, the lens support 1 has a first lens 15 and a second lens 16 which is held via a tripod-like holding element 17, which can be positioned on the lens support 1 such that it can be adjusted during the assembly process, in order to align the second lens 16. The holding part 17 is, of course, fixed after alignment of the second lens 16.

A flexible printed circuit ribbon 18 is also shown, and is wound around three sides of the optical assembly. The printed circuit ribbon 18 has all the required conductor tracks and connecting tracks which are used to make contact with the controllable parts of the optical assembly, that is to say the image recording unit 4, the actuating element 7, that is to say the motor which may also be a piezoelectric motor, as well as any other optical components which are not shown in any more detail in FIGS. 17-20, such as a combined part 19 containing a shutter and a diaphragm, which can likewise be operated via an external control device. For connection to the external control device, a connecting lug is provided by means of the flexible printed circuit ribbon 18, to which the control device of the mobile telephone is connected. This is designed such that the individual parts such as the motor, etc. do not need to be coupled in a complex and separate manner to the printed circuit track 18 and, instead, this is done automatically while the printed circuit ribbon 18 is being "wound around", for which purpose the contact points that are necessary to do this are positioned on the printed circuit ribbon 18 corresponding to the position of the connecting sections of the respective operable electrical or electromechanical component. An adhesive surface 27 is formed on the lower face of the flexible printed circuit ribbon 18 and represents an attachment element, via which the optical assembly is adhesively bonded, for example, to an attachment surface of the mobile telephone. It is also feasible for the optical assembly to also have motor control, in addition to the complete image processing unit. The image data is therefore produced by the optical assembly, with the line connection for the telephone and its control module being used only to transmit the image data from the camera to the memory there, and for trigger control. The motor or motors of the optical assembly is or are controlled via its or their own integrated motor control.

As already described, the complete optical assembly also has an integrated part 19 comprising a shutter and a diaphragm. In the embodiment described in FIG. 21, this part 19 is attached to the lens support 1 and in consequence has a fixed position relationship with the two lenses 15 and 16. The shutter/diaphragm part 19 in this embodiment is moved together with the lens support 1 and in consequence the lenses 15, 16 relative to the stator 2 and therefore relative to the image recording chip 4. It is, of course, also feasible for the part 19 to be mounted such that it can move autonomously on its own support which, like a lens support 1, has a corresponding toothed section or like, via which coupling is provided to a separate actuating motor. However, it is expedient to arrange the part 19 directly closely adjacent to the lens group, in order to avoid any imaging errors.

Figure 21:
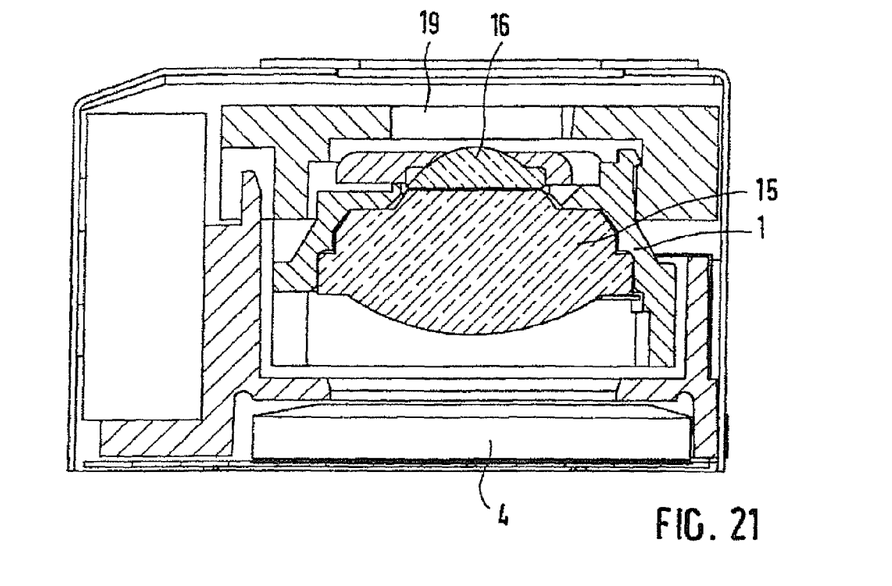
FIG. 21 shows a section view through a complete, housed optical assembly.
Figure 22:
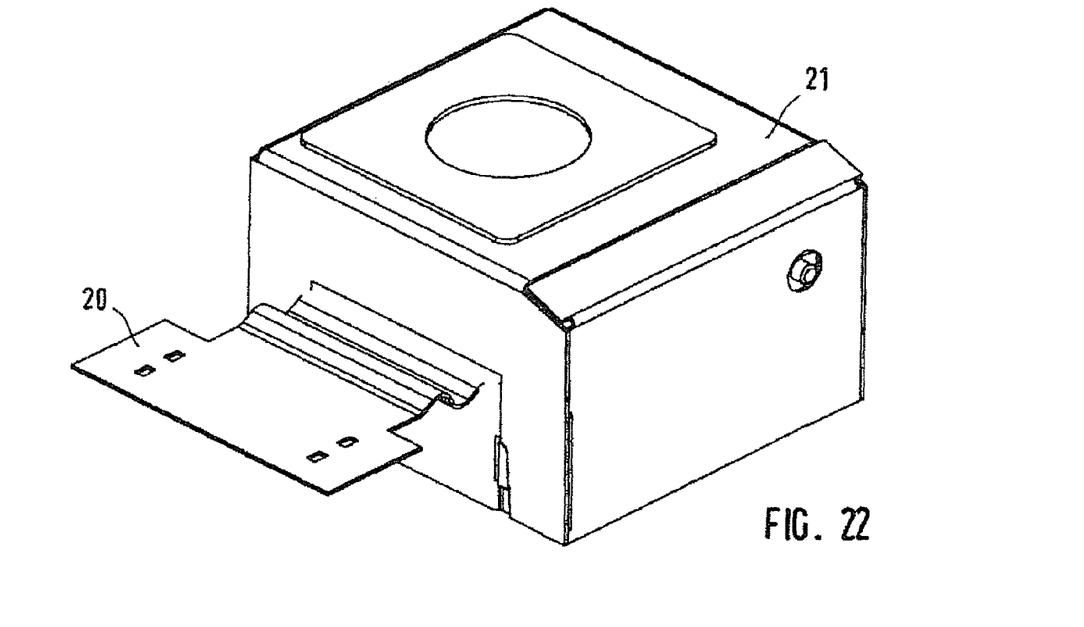
FIG. 22 shows a perspective side view of the optical assembly shown in FIG. 21.

Furthermore, FIGS. 21 and 22 show a metallic housing 21 which encapsulates the entire optical assembly and from which only the connecting lug 20 projects.

Figure 23:
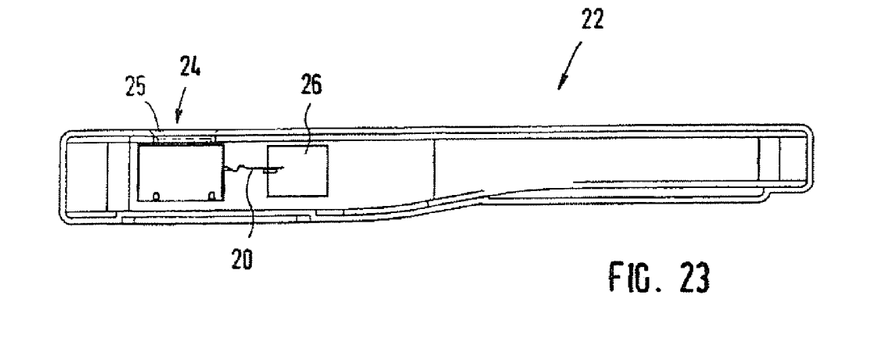
FIG. 23 shows a mobile telephone according to the invention with an optical assembly according to the invention.
Figure 24:
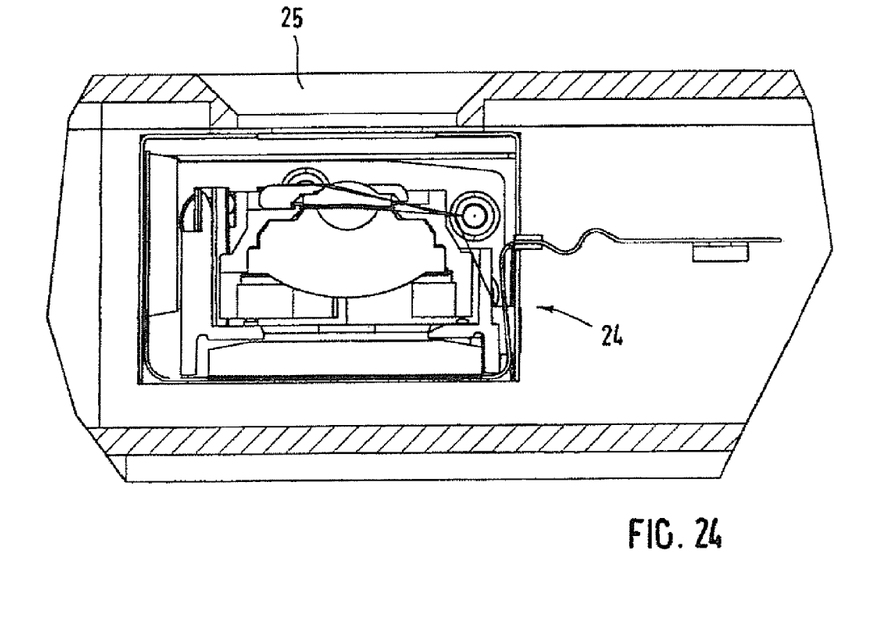
FIG. 24 shows an enlarged side view in a section of the mobile telephone together with the optical assembly from FIG. 23.

FIGS. 23 and 24 show a mobile telephone 22 according to the invention. The outline sketch in FIG. 23 shows an optical assembly 24 according to the invention which may be of any desired nature (the embodiments of the optical assemblies as described above are, of course, not exclusive and limiting), which is arranged in a manner known per se underneath a transparent window 25. Merely by way of example, the figures in this case show the external control device 26 as well as an image data memory of the mobile telephone 22, which is connected via the connecting lug 20 to the optical assembly 24 and carries out the control functions (completely or partially) for it. Depending on the requirement, and depending on the design of the optical assembly 24 which, in the example shown in FIG. 24, corresponds in the end to the optical assembly in FIG. 21, it is now possible to adjust the lens optics together with the associated shutter/diaphragm assembly. Extremely exact positioning, the fundamental precondition for optically good image recording, can be achieved as a consequence of the high-precision guidance of the optically operating components, that is to say in this case of the lens support as well as the associated further optical components, relative to the image recording means, that is to say in this case the chip 4 and the image recording plane.

Advantages of the present solution according to the invention:
only two parts
these parts are the guides at the same time
no load on the optical elements
nevertheless, prestressed guidance possible (without play)
rolling friction, no slipstick effect, low drive force
extremely compact design with very small physical heights (important for mobile telephone objectives)
the tolerance chain between the optics and image recording is extremely short
in the example, the stator is at the same time a protective housing for the optics and the image sensor
high strength of the assembly and guidance, without influencing the optical elements
guidance accuracy is dependent on only two parts
movement of different individual components is possible independently of one another
insensitive to vibration
stiff against twisting
because of the use of the same materials, the influence of temperature fluctuations on the position of the optical axis is extremely minor
the image recording elements are mounted in the same part (stator) as the objective.

The invention claimed is:

1. An optical assembly comprising:
at least one optical component and a stator,
wherein the optical component is mounted on the stator via a roller bearing linear guide with rolling body guide paths (A, B, C, D) which are formed on the optical component and on the stator, in the area of which linear guide a motor actuating element acts on the optical component such that the optical component can be moved relative to the stator along an axis which is at right angles to an image recording plane of an image recording means; and
wherein a side attachment is provided on the optical component, on which attachment two guide paths (A, B) are formed which are opposite one another at the side, which attachment engages in a holding area, which is provided on the stator and has two mutually opposite guide paths (C, D), wherein the mutually opposite guide paths (A, B, C, D) of the attachment and of the holding area complement one another to form two guide channels with rolling bodies therein.

2. The optical assembly of claim 1, wherein the rolling bodies are held in a prestressed manner.

3. The optical assembly of claim 2, wherein the guide paths (C, D) of the stator are sprung.

4. The optical assembly of claim 3, wherein the guide paths (C, D) are provided on sections which are sprung on the stator.

5. The optical assembly of claim 4, wherein the sprung sections are separated from the stator base via a narrow gap.

6. The optical assembly of claim 1, wherein a toothed section with which a pinion on the motor actuating element engages, is provided on a or the side attachment which is provided on the optical component.

7. The optical assembly of claim 1, wherein two or more optical components and a common stator, are provided.

8. The optical assembly of claim 7, wherein each of the optical components can be moved separately relative to the stator via its own motor actuating element, or in that at least some of the optical components are coupled to one another for movement purposes and can be moved via a common motor actuating element, while the other optical component or components can be moved relative to the stator via possibly in each case one dedicated motor actuating element.

9. The optical assembly of claim 8, wherein two or more optical components are provided, wherein the attachments on the optical components which are arranged one above the other are aligned rotatable through an angle with respect to one another and wherein holding areas for the respective attachments are provided, corresponding to the position of the attachments, on mutually opposite sides of the stator.

10. The optical assembly of claim 9, wherein the attachments on the lower and on the upper optical component are located one above the other and engage in a common holding area, while the attachment on the central optical component is rotated through an angle and engages in a holding area which is arranged correspondingly offset.

11. The optical assembly of claim 8, wherein three or more optical components are provided, wherein only the lower first and the following optical component have an attachment, which attachments are positioned rotated through an angle with respect to one another and are arranged in corresponding holding areas in the stator, and wherein the third and possibly following optical components is or are coupled for movement purposes to the lowest first or the following optical component via a connecting arm.

12. The optical assembly of claim 7 wherein two or more optical components are provided, whose attachments are located one above the other and engage in a common holding area.

13. The optical assembly of claim 1, wherein least one optical component is a lens support, and at least one optical component is a shutter and/or a diaphragm.

14. The optical assembly of claim 13, wherein the shutter and the diaphragm are integrated in a common part.

15. The optical assembly of claim 13 wherein the shutter and/or the diaphragm is or are arranged on a lens support and can be moved with it.

16. The optical assembly of claim 1, wherein a plurality of motor actuating elements can be operated via a common control device.

17. The optical assembly of claim 1, wherein one or more attachment elements for attachment of the optical assembly to a third object is or are provided on the stator.

18. The optical assembly of claim 17, wherein the attachment elements are screw connections or snap-action latching connections, or an attachment element is in the form of an adhesive surface.

19. The optical assembly of claim 1, wherein the image recording means is arranged on the stator.

20. The optical assembly of claim 1, wherein a flexible printed circuit ribbon which can be connected to an external control device is provided, to which the image recording means and the motor actuating element and possibly further optical components or parts which contain such components are connected.

21. The optical assembly of claim 1, wherein the optical assembly has a metallic housing.

22. A mobile telephone, comprising an optical assembly of claim 1.

23. An optical assembly comprising:
at least one optical component and a stator,
wherein the optical component is mounted on the stator via a roller bearing linear guide with rolling body guide paths (A, B, C, D) which are formed on the optical component and on the stator, in the area of which linear guide a motor actuating element acts on the optical component such that the optical component can be moved relative to the stator along an axis which is at right angles to an image recording plane of an image recording means;
wherein a side attachment is provided on the optical component, on which attachment two guide paths (A, B) are formed which are opposite one another at the side, which attachment engages in a holding area, which is provided on the stator and has two mutually opposite guide paths (C, D), wherein the mutually opposite guide paths (A, B, C, D) of the attachment and of the holding area complement one another to form two guide channels with rolling bodies therein; and
wherein the optical component is guided via at least three rolling bodies, wherein at least two are provided in one of the guide channels.

* * * * *